(12) United States Patent
Ayres et al.

(10) Patent No.: US 6,278,424 B1
(45) Date of Patent: *Aug. 21, 2001

(54) MINIATURE TELLTALE MODULE

(76) Inventors: John A. Ayres, 1252 Oakridge Dr.;
Michael E. Salmon, 968-2 Golf View
La., both of Lapeer, MI (US) 48446

(*) Notice: Subject to any disclaimer, the term of this patent is extended or adjusted under 35 U.S.C. 154(b) by 0 days.

This patent is subject to a terminal disclaimer.

(21) Appl. No.: 08/446,415

(22) Filed: May 22, 1995

Related U.S. Application Data

(63) Continuation-in-part of application No. 08/056,087, filed on May 3, 1993, now Pat. No. 5,442,338.

(51) Int. Cl.$^7$ ..................................................... G09G 3/32
(52) U.S. Cl. ................................. 345/82; 340/815.64
(58) Field of Search ................................... 340/485, 486,
340/483, 484, 561, 518, 524, 815.4, 815.45,
815.64, 815.67, 461, 462, 463, 756, 782;
40/473, 493, 502, 532, 426; 362/284, 324,
26, 27, 29, 30; 192/30 W; 335/272; 116/DIG. 36,
288; 345/82

(56) References Cited

U.S. PATENT DOCUMENTS

| | | | | |
|---|---|---|---|---|
| 1,823,319 | * | 9/1931 | Dickinson | 340/524 |
| 2,749,541 | * | 6/1956 | Whittlesey | 340/461 |
| 3,375,512 | * | 3/1968 | Watkins et al. | 335/272 |
| 3,492,615 | * | 1/1970 | Watkins | 340/815.64 |
| 3,660,814 | * | 5/1972 | Fales | 340/52 F |
| 3,835,450 | * | 9/1974 | Reck | 340/52 F |
| 3,839,701 | * | 10/1974 | Pomerantz | 340/52 F |
| 3,936,799 | * | 2/1976 | Hynes | 340/461 |
| 4,182,059 | * | 1/1980 | Greene | 40/493 |
| 4,446,810 | * | 5/1984 | Bressi | 40/493 |
| 4,884,058 | * | 11/1989 | Ikeda | 340/461 |
| 5,028,900 | * | 7/1991 | DeWitt | 335/272 |
| 5,084,698 | * | 1/1992 | Sell | 340/762 |
| 5,432,497 | * | 7/1995 | Briski et al. | 340/461 |
| 5,442,338 | * | 8/1995 | Ayres et al. | 340/815.64 |

FOREIGN PATENT DOCUMENTS

1061123 * 3/1967 (GB) .................................. 340/461

OTHER PUBLICATIONS

SAE Technical Paper #930550, Miniature Telltale Module, Dave Ehle, Mar. 1993.*

* cited by examiner

*Primary Examiner*—Chanh Nguyen
(74) *Attorney, Agent, or Firm*—Clark Hill PLC

(57) ABSTRACT

A miniature telltale module which combines a plurality of telltale functions into one unit and provides reduced cost per function. The module uses a miniature rotary actuator or driver, an image disc having a series of interconnected images or icons and a single light source. The actuator or driver allows a wide tolerances at the inputs while still precisely selecting the image positions. The module includes a light absorbing shield disposed about a light source and having a light opening positioned and sized to provide illumination of the icon, containment of light not directed through the light opening, and control of the angle of light emitted from the opening.

19 Claims, 8 Drawing Sheets

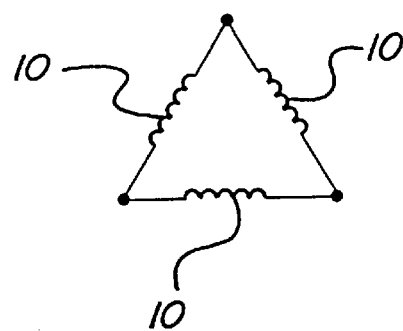
FIG-2
| Actuator Inputs | | | Actuator Output |
|---|---|---|---|
| A | B | C | POSITION |
| – | H | L | 30° |
| H | – | L | 90° |
| H | L | – | 150° |
| – | L | H | 210° |
| L | – | H | 270° |
| L | H | – | 330° |
"–" INDICATES FLOATING INPUT
FIG-3
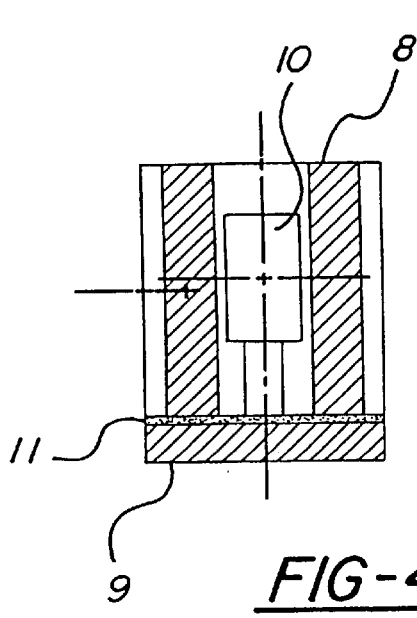
FIG-4
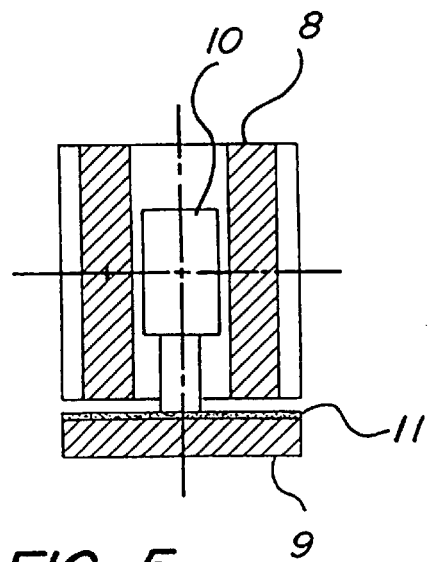
FIG-5

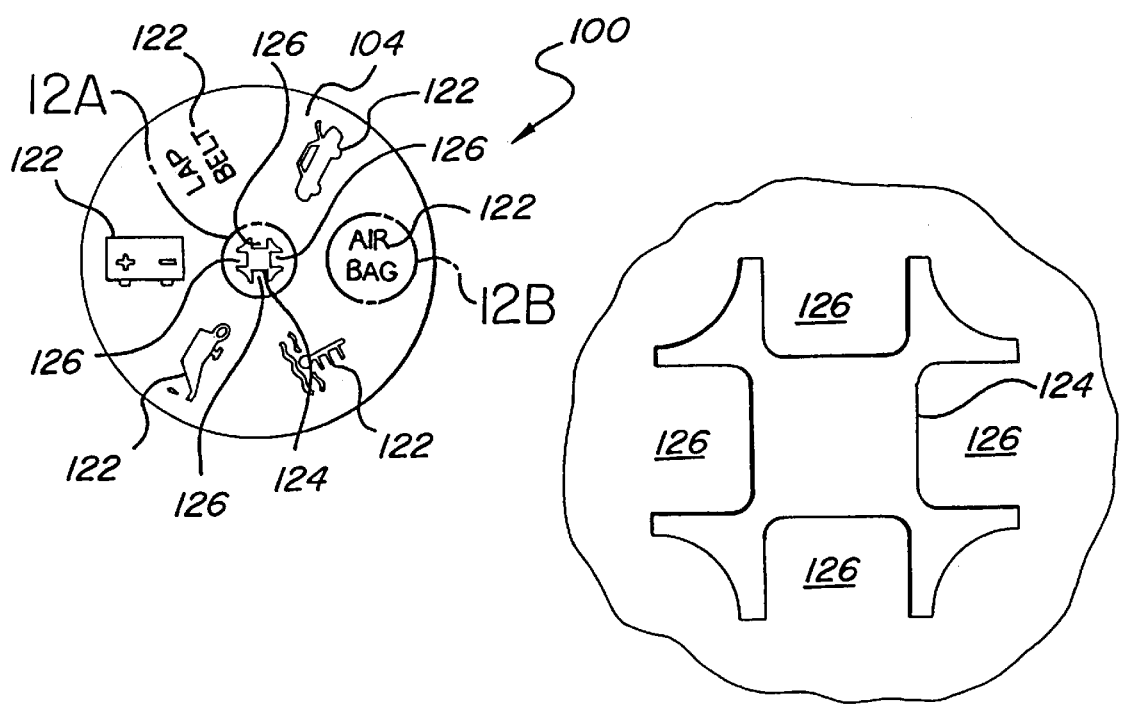
FIG-12
FIG-12A
FIG-12B

MINIATURE TELLTALE MODULE

CROSS-REFERENCES TO RELATED APPLICATIONS

This application is a continuation-in-part of application Ser. No. 08/056,087 filed on May 3, 1993 now U.S. Pat. No. 5,442,338 and titled "Miniature Telltale Module".

BACKGROUND OF THE INVENTION

The field of the invention is generally that of indicators, and more specifically, to an improved miniature telltale module.

Most automotive instrument clusters contain fifteen to twenty-five warning or information indicators (telltales). Packaging these functions as part of an instrument cluster design inhibits the flexibility of the design and creates complexity throughout the assembly.

The instrument cluster housing typically provides the support for the telltale bulbs. The housing also incorporates complex structures to eliminate light leakage (or crosstalk) from adjacent telltales or into the instrument graphics areas.

Telltale bulbs are commonly powered through a flexible circuit which is placed on the back of the instrument case. The size and complexity of the flexible circuit required in each instrument is highly dependent on the telltale arrangement. Flexible circuits, therefore, add cost to the telltale function and increase the number of electrical connections thus decreasing the system reliability.

Current production instrument clusters contain a light bulb and socket for each telltale function. Material and assembly costs to install, test and inspect these bulbs accumulates into a significant portion of the instrument cluster cost because so many are needed. Incandescent bulb life and reliability continues to be an important factor even though bulb and socket design improvements have been made.

Prior Art:

Several types of devices are known which have attempted to solve the problems stated above. By combining several telltale indications or messages into one unit, Pomerantz (U.S. Pat. No. 3,839,701) and Reck (U.S. Pat. No. 3,835,450) both taught the use of a D.C. Motor to rotate a message carrying drum using gears. Mechanical switches were incorporated to stop the motor at the required locations and a lamp was lighted to display the message or image. Both of these devices are complex electro-mechanical assemblies containing many parts, some of which are required to be precise (i.e. gears). This forces the cost of these devices to be high and thus they have not been used extensively.

Fales (U.S. Pat. No. 3,660,814) teaches a simpler method of actuating a message carrying drum but like Pomerantz and Reck the assembly is large and therefore consumes too much space and thus is difficult to package within the instrument cluster. Also, the drum construction creates a large inertial load on the actuator thus requiring the Fales actuator to be heavily damped (with viscous fluid) to eliminate overshoot and ringing. This presents a response problem similar to the D.C. motor actuation and adds the need for the emergency indicator and it's required control logic. The extended period of time that the actuators are driven also increases the power consumption of the unit. In fact, Fales powers the actuator and the lamp all the time that a fault condition is signaled.

The cost and design flexibility problems of current approaches coupled with the fact that the prior art has not provided acceptable solutions calls for a new concept.

The present invention provides this new concept by disclosing a miniature telltale module that has the capability of containing a large number of images or messages. Further, this module is designed to be low cost and provides a variety of packaging options to enhance flexibility.

SUMMARY OF THE INVENTION

The present invention provides an image display arrangement or apparatus that includes a simple, reliable, multi-positional image indicator.

Generally speaking, the present invention comprises a novel miniature rotary actuator or drive, a series of interconnected images or indications and a single light source. The magnetic design of the miniature actuator allows wide tolerances at the inputs while still precisely selecting the image position.

The actuator also has a unique locking device (or brake) which automatically engages when power is removed. This feature allows the control circuitry to select an image with a momentary pulse and then remove the power from the actuator. Power consumption is thereby minimized since no power is required by the actuator except when changing the image to be displayed.

A series of images or indications are carried on a continuous loop of transparent film and are guided between the light source (LED) and a simple projector lens.

The small size of the miniature telltale module allows instrument cluster designers to easily incorporate many telltales into instrument cluster designs while maintaining simple construction.

More specifically, the present invention is an image display apparatus having a substrate that acts as a base having an integrated circuit and electrical connections. A driver is mounted on the substrate and electrically connected to the integrated circuit. The driver includes a controllable rotatably positionable drive providing a plurality of drive rotational positions in response to electrical signal inputs. The image display apparatus further includes an image disc having at least one radially disposed indication on the disc. The image disc is driven by the driver for rotational movement to the plurality of drive rotational positions. The image display apparatus also includes a light source electrically connected to the integrated circuit for illuminating the indication upon juxtaposition with the light source via rotational positioning of the image disc and illumination of the light source.

In one embodiment of the invention, the light source is a directional light source and the image display apparatus includes a light absorbing shield having a light opening. The shield is connected to the substrate about the light source and the light opening is positioned and sized relative to the light source and the image disc to provide illumination of the indication, absorption of light not directed through the light opening, and control of the angle of light emitted from the opening.

In another embodiment of the invention, the light source is a diffusing light source and the image display apparatus includes a light box positioned about the light source. The light box includes a light opening to allow light to illuminate the indication. The light box contains light within the box and allows light to be reflected within the box.

Preferably, the image display apparatus of the present invention further includes an attachment hub for mounting the image disc to the drive. The hub and image disc provide a locking mechanism for attaching or locking the image disc to the hub in a snap-fit arrangement.

In one arrangement, the image disc is constructed of a transparent light transmitting material and the indication is formed by a light blocking application on the image disc.

In another arrangement, the image disc is constructed of a metallic material and the indication is formed in the image disc by cutting or chemical etching.

It is an object of the present invention to provide a novel miniature telltale module which optimizes cost, packaging, control, power consumption and reliability.

It is a further object of the invention to provide a novel telltale module that is low in cost.

It is another object of the invention to provide a novel small package size to allow design flexibility within the instrument cluster.

It is a further object of the invention to provide simple control inputs to accurately select the required image which allows the module to be interfaced to sensor outputs with low cost circuitry.

It is another object of the invention to provide a device having low power consumption which is desirable to minimize heat dissipation within the cluster.

Another object of the invention is to provide a miniature telltale module which only illuminates the image or indication to be displayed and does not interfere with light used to illuminate the areas surrounding the image disc.

It is another object of the invention to provide a novel locking mechanism for locking the image disc to the driver or actuator.

It is another object of the invention to use chemical etching techniques to etch the indication in a metallic image disc.

It is another object of the invention to construct the image disc from a transparent material and deposit an opaque coating thereon to form the indications.

Further objects are implicit in the detailed description which follows hereinafter (which is to be considered as exemplary of, but not specifically limiting, the present invention) and said objects will be apparent to persons skilled in the art after a careful study of the detailed description which follows.

For the purpose of clarifying the nature of the present invention, one exemplary embodiment of the invention is illustrated in the hereinbelow-described figures of the accompanying drawings and is described in detail hereinafter. Alternative embodiments are also shown. All are to be taken as representative of the multiple embodiments of the invention which lie within the scope of the invention.

These and other features and advantages of the invention will be more fully understood from the following detailed description of the invention taken together with the accompanying drawings.

BRIEF DESCRIPTION OF THE DRAWINGS

In the drawings:

FIG. 2 is a schematic diagram of the stator coils of the actuator or driver;

FIG. 3 is an actuator module truth table;

FIG. 4 is a cross-sectional view of the actuator or driver showing the actuator brake on when the power is off;

FIG. 5 is a cross-sectional view of the actuator or driver showing the actuator brake off when the power is on;

FIG. 12 is a top view of the image disc used in the second alternative embodiment of the present invention which also depicts a close-up view of the centrally located aperture of the image disc and a close-up view of one of the indications thereon;

DETAILED DESCRIPTION OF THE INVENTION

Figure 1:
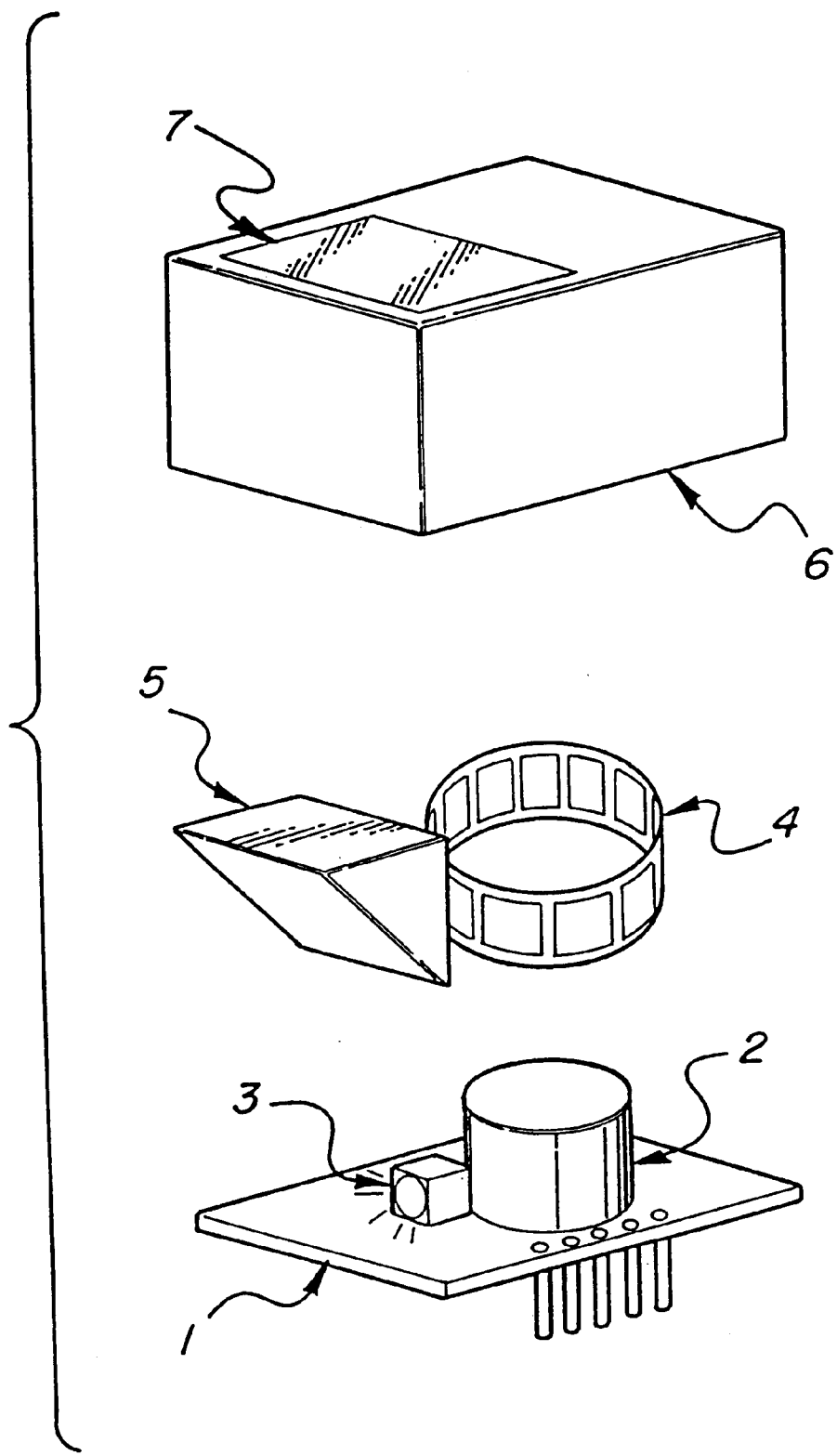
FIG. 1 is a perspective view showing one exemplary embodiment of one representative form of the invention.

Referring to FIG. 1, substrate 1 is used as a base and for electrical connections. An integrated circuit is fabricated into substrate 1. Alternatively, an integrated circuit is contained on another circuit assembly to which substrate 1 is connected. Actuator 2 is mounted on substrate 1 by using glue. LED lamp 3 is soldered to substrate 1. Image strip 4 is placed around actuator 2 and LED lamp 3 and is held in place by the spacing of actuator 2 and LED lamp 3. Right angle optics 5 is fixedly attached to substrate 1.

A series of images are carried on image strip 4 and are guided between LED lamp 3 and right angle optics 5. Cover 6 is placed over substrate 1 and fixedly attached. Cover 6 has screen 7 which mounts adjacent to right angle optics 5 so that the images are projected (in focus) onto screen 7.

Referring to FIG. 2, actuator 2 has three inputs which are labeled A, B, and C. These inputs are the Delta connection points of the three stator coils 10.

Referring to FIG. 3, a truth table describes the relationship between actuator 2 inputs (A, B, and C) and the rotational position (or output) of magnet 8. The inputs have either a high (H), a low (L) or a floating input (−). By using three inputs for A, three inputs for B, and three inputs for C; six output positions for actuator 2 are obtained. Note that additional output positions may be obtained by using other binary or tri-state combinations for A, B, and C; Thus providing more than six output selections. The example of six positions is used here for clarity of description and should not be taken to limit the scope of the invention.

Referring to FIG. 4, actuator 2 is shown with power off and the brake on. When no current is flowing in stator coils 10, brake disc 9 attracts magnet 8 and causes magnet 8 to move axially until contact occurs between magnet 8 and brake disc pad 11.

Referring to FIG. 5, actuator 2 is shown with power on and the brake off. When power is applied, the brake is released because the magnetic field of the stator coils 10 overcomes the magnetic brake force and causes magnet 8 to center itself (axially) on the stator coils 10. Magnet 8 is then free to rotate to the requested position (according to the truth table in FIG. 3) and the brake reapplies when the input power is removed.

Figure 6:
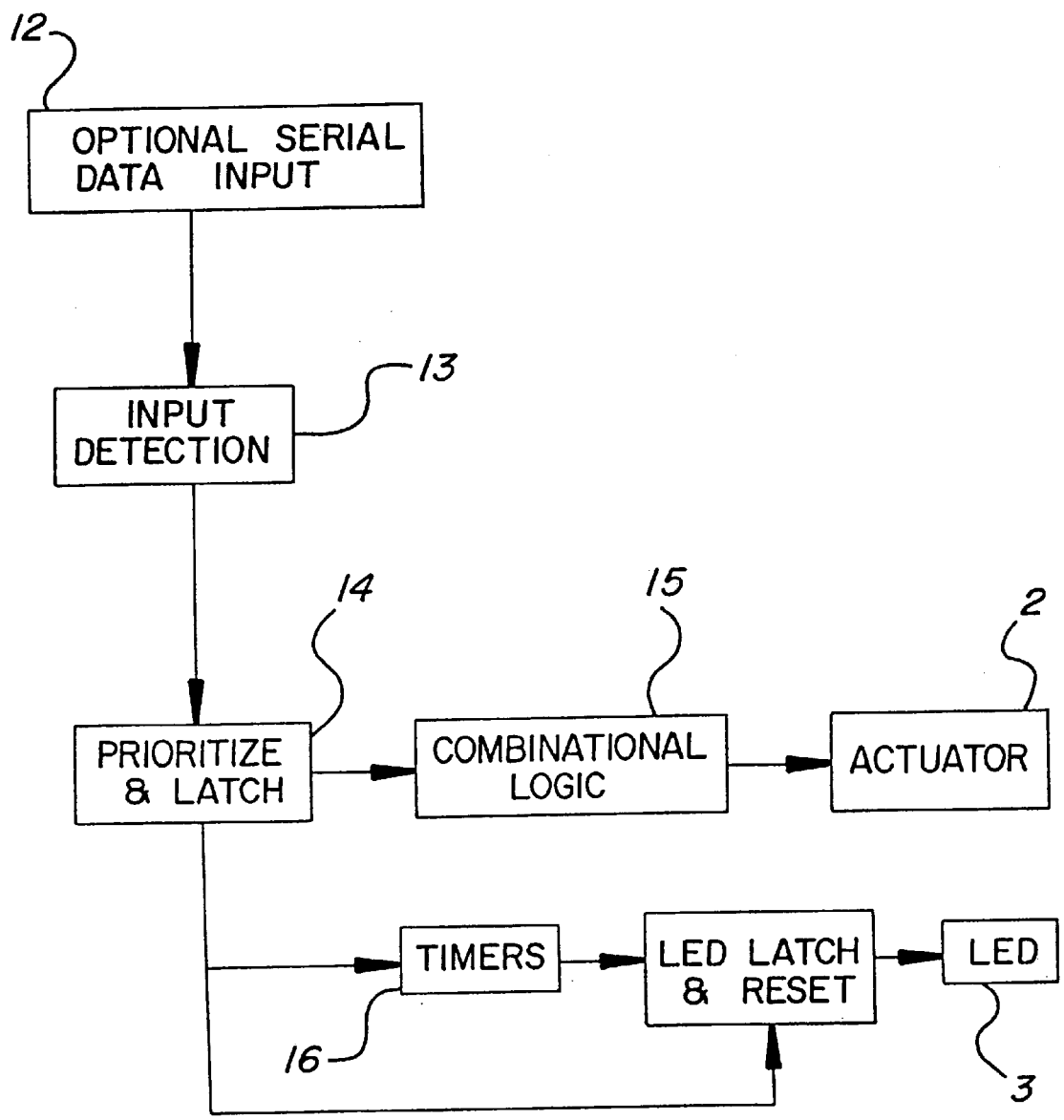
FIG. 6 is a diagram of the control logic circuitry for the actuator or driver and the light source.

FIG. 6 is a block diagram of an exemplary logic circuit used to control the actuator 2 and the LED lamp 3. The inputs levels are monitored for indication of a fault or warning at block 13. Optionally, block 12 provides serial data input through communications with other monitoring devices. Block 14 processes and stores the input change according to a user defined priority. The combination logic 15 and timers 16 then apply the appropriate signals to actuator 2 for a sufficient period of time to ensure the image is in place. The timers 16 then remove power from actuator 2 and power is applied to LED lamp 3. Total elapsed time from input changes to the light source being powered is generally in the order of 0.3 to 0.5 seconds. The preferred embodiment would contain the logic circuitry of FIG. 6 in a single integrated circuit package to reduce assembly costs and space.

Figure 7:
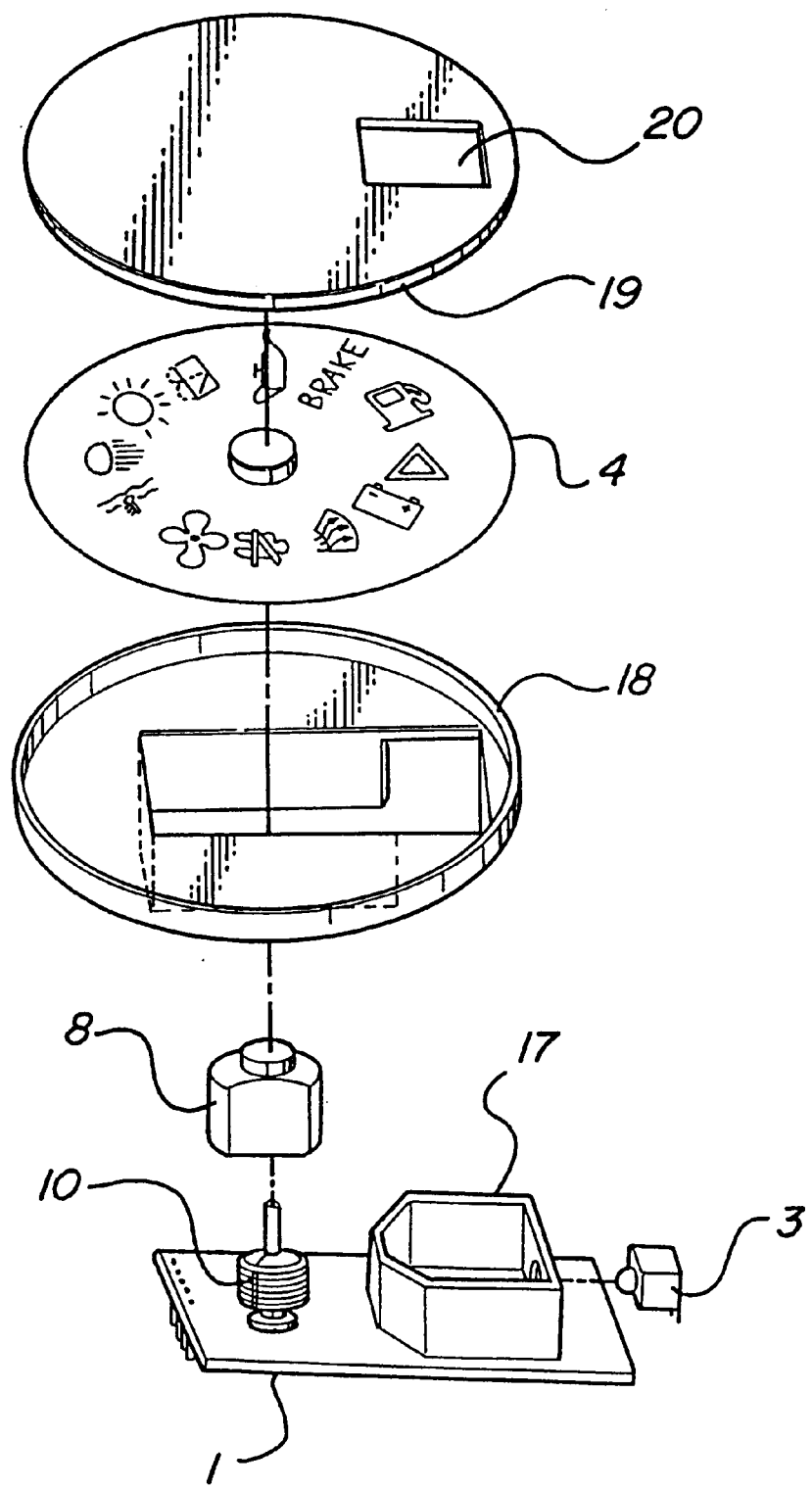
FIG. 7 is an exploded perspective view of an alternate embodiment of the present invention.

Referring to FIG. 7, substrate 1 is the base for the assembly and contains electrical connections. The stator coils 10 and LED lamp 3 are soldered to substrate 1. The integrated circuit may also be soldered to substrate 1 or may be part of another circuit assembly to which substrate 1 is connected. Magnet 8 is placed around the stator coils 10 and is attached to the image strip 4 such that both are free to rotate about the stator coils 10. Into light box 17 which is fixedly attached to substrate 1. Housing 18 and cover 19 are used to enclose the rotating members (magnet 8 and image strip 4) and to provide window opening 20 through which the selected image is viewed.

Those skilled in the art will recognize that substrate 1, housing 18 and cover 19 may individually be incorporated into larger multifunction components within an instrument cluster.

Figure 8:
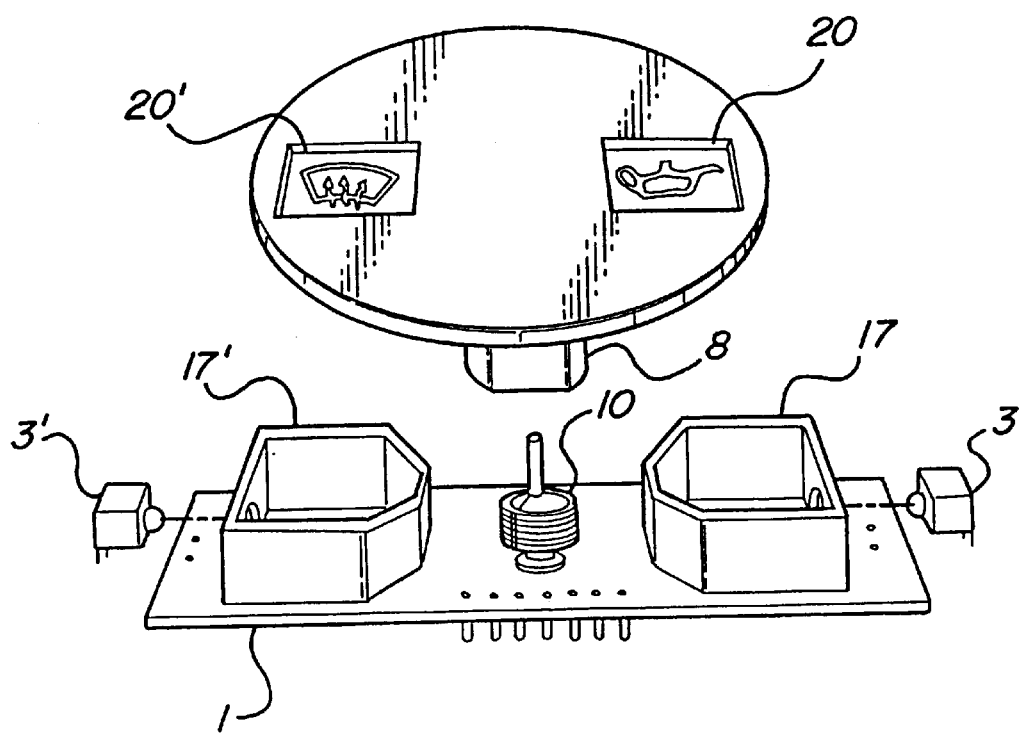
FIG. 8 is a perspective view of the alternate embodiment that shows a plurality of display windows, light sources and light boxes.

Referring now to FIG. 8, the embodiment of FIG. 7 is shown with a plurality LED lamps 3 and 3', a plurality of light boxes 17 and 17' cooperating with a plurality of window openings 20 and 20'. This configuration allows multiple warnings to be displayed or the use of LED lamps 3 and 3' that are different colors. Alternately, different color LED lamps 3 and 3' could be mounted for use with just one light box 17.

A second alternative embodiment of the tell-tale module, image display arrangement or apparatus is shown in FIGS. 9–15 and is generally indicated by the numeral 100. Because many of the details of the second alternative embodiment are similar to those other embodiments of the present invention already described herein, similar or like numerals or similarly ending numerals are used for like parts and further description is deemed unnecessary except as included below to clarify and describe any modifications.

Figure 9:
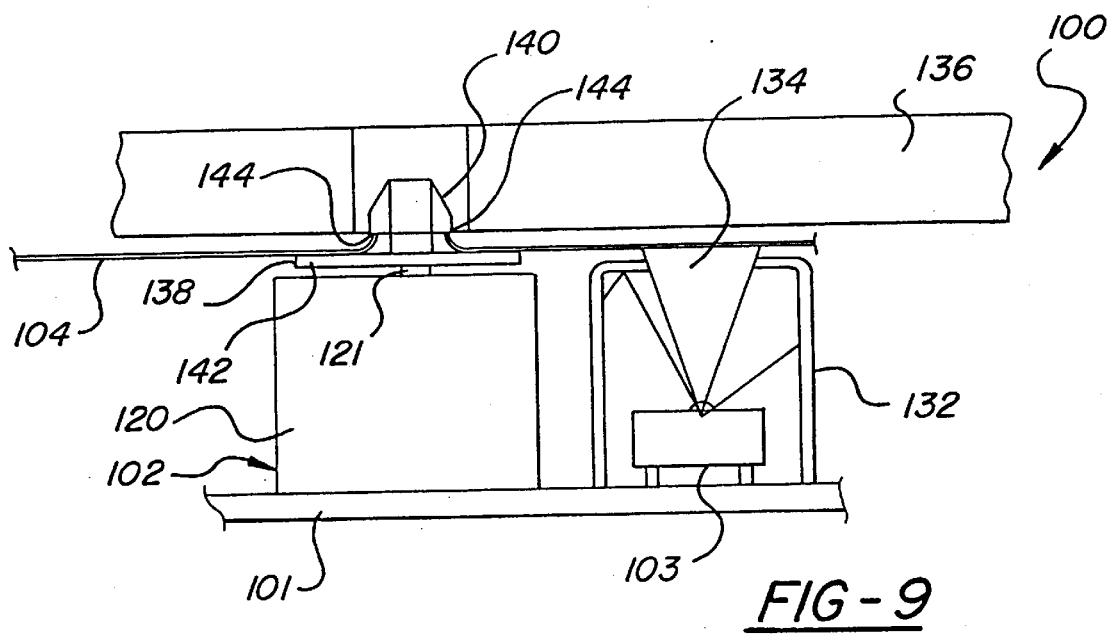
FIG. 9 is a cross-sectional view of a second alternative embodiment of the image display apparatus of the present invention.
Figure 10:
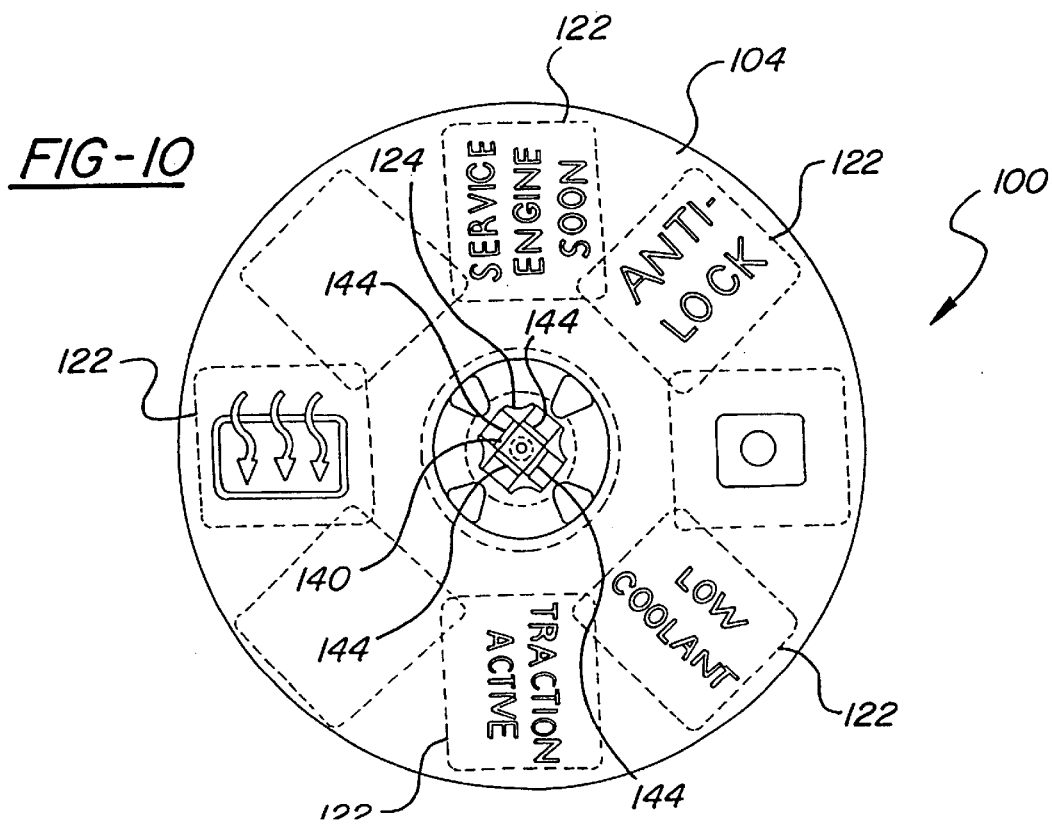
FIG. 10 is a top view of the second alternative embodiment that shows the image disc and the attachment hub to which the image disc is connected.

Referring to FIGS. 9–10, the image display arrangement or apparatus 100 includes a substrate 101. The substrate 101 acts a base having an integrated circuit and electrical connections. The image display apparatus 100 further includes a driver 102 mounted on the substrate 101 and electrically connected to the integrated circuit contained thereon. The driver 102 includes a controllable rotatably positionable drive 120 and drive shaft 121 extending from the drive 120. The driver 102 and drive shaft 121 provides a plurality of drive rotational positions in response to electrical signal inputs. The electrical signal inputs may be transferred from the integrated circuit contained on the substrate 101 to the driver 102.

In a preferred embodiment, the driver 102 is an air core gauge having at least two coils 10 (shown in FIG. 11) electrically connected to the substrate 101 and having inputs of plus ("+" or a positively biased voltage), minus ("−" or a negatively biased voltage) and no voltage ("0"). The gauge may also include a magnet 8 mounted on the drive shaft 121 as previously described and shown in FIGS. 4 and 5.

Figure 11:
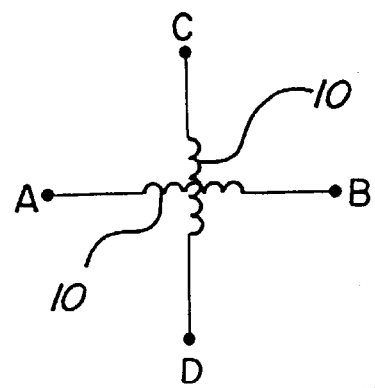
FIG. 11 is a sectional schematic diagram of the coils of the driver of FIG. 9.

Referring to the table below, the relationship between the coil 10 inputs A and B in FIG. 11 and the rotational position of the drive 120 wherein the rotational movement of the drive 120 or drive shaft 121 is measured in degrees of rotation from a default or home position is shown. The default or home position of the drive 120 or drive shaft 121 is identified as zero degrees. By using the three inputs a plus (+), minus (−) and no voltage (0) for each of the two coil inputs A and B, eight rotational positions for the drive 120 or drive shaft 121 can be obtained.

TABLE 1

| Coil Input A | Coil Input B | Rotary Position (In degrees) |
|---|---|---|
| + | 0 | 0 |
| + | + | 45 |
| 0 | + | 90 |
| − | + | 135 |
| − | 0 | 180 |
| − | − | 225 |
| 0 | − | 270 |
| + | − | 315 |

The drive 120 or drive shaft 121 is positioned into the default or home position (0 degrees) by applying a positively biased voltage or plus (+) to the coil input A while not supplying voltage (0) to coil input B. To position the drive 120 or drive shaft 121 forty five degrees from the home or default position, the plus (+) would be applied to both coil inputs A and B. In a similar manner, the six remaining rotational positions may be obtained.

Referring to FIGS. 9, 10, and 12, the image display apparatus 100 further includes a generally planar image disc 104 having at least one radially disposed indication 122 on a generally planar portion thereof. The image disc 104 is rotatably driven by the drive 120. The image disc 104 is illustrated as being mounted on the drive shaft 121 for rotational movement with the drive shaft, however alternative drive arrangements become apparent to one skilled in the art. In other words, the image disc 104 moves in a rotational fashion relative to the substrate 101.

The disc 104 may be constructed from a metal material, i.e. the disc 104 may be made of full, hard 316 stainless steel material. However, it will be appreciated that any metal material with similar properties may be used. Alternatively, the disc 104 may be made of a transparent material which allows light to pass through the disc 104. For example, disc 104 may be made of a clear plastic material. In the embodiment illustrated, the thickness of the disc 104 is generally 0.002 inches.

The disc 104 includes a centrally located aperture 124. The aperture 124 has a non-circular cross section. The disc 104 includes one or more tabs 126 adjoining the centrally located aperture. If the disc 104 is made of metal, commercially available and known chemical etching techniques may be used to etch the indications or translucent icons 122 into the disc 104. Referring to FIG. 12, a close-up enlarged view of an indication 122 is shown formed by the process of chemical etching. Connectors 128 are used to hold the centers 130 of the indications or icons 122 in place and connected to the remaining portions of the disc 104. Typically, the connectors 128 about 0.002 inches wide making them virtually invisible to the naked eye. The metal image disc 104 may include a non-reflective coating on its surface. The non-reflective coating may be paint, ink or a chemically deposited oxide.

A disc 104 made of a transparent material, may be coated with an opaque coating or have an applique applied to form the indication 122 to prevent light from passing through the image disc 104 in selected areas. Whereas the indications 122 of a chemically-etched metal disc 104 is formed by etching holes in the disc 104, the indications 122 of the clear plastic disc 104 are formed by those areas of the disc 104 which are covered.

Again referring to FIG. 10, the image display apparatus 100 further includes a light source or illuminator 103 electrically connected to the integrated circuit of the substrate 101 for illuminating the indication 122 upon juxtaposition with the light source 103 via rotational positioning of the image disc 104 and illuminating of the light source 103. Although a light emitting diode is preferred, any light source may be used for the present invention, i.e. a directional light source such as a light emitting diode or laser or a diffusing light source such as a conventional incandescent lamp.

The image display apparatus 100 further includes a light absorbing shield or cover 132. The light absorbing shield 132 includes a light opening 134 for allowing the illumination cast by the light source 103 to pass therethrough. The shield 132 is connected to the substrate 101 and is disposed around or about the light source 103. The light opening 134 is positioned and sized relative to the light source 103 and the image disc 104 to provide illumination of the indication 122. The light shield 132 is internally constructed to absorb light not directed through the light opening 134 and also to control of the angle of light emitted from the opening 134. In other words, the shield 132 prevents light cast by the light source 103 from being cast on any other area of the disc 104 other than the area defined by the indication 122 to be illuminated.

The image display apparatus 100 further includes a light sheet 136 extending in spaced relationship relative to the image disc 104 for viewing the indication 122 through the light sheet 136. The light opening 134 is positioned and sized to direct light from the light source 103 to strike the light sheet 136 at an angle generally less than forty five degrees, and hereinafter more fully described, to allow the light to pass through the sheet 136 without being reflected and captured within the sheet 136. The light opening 134 of the light shield 132 is positioned as close as possible to the image disc 104 without contacting the disc 104 so that the gap between the light shield opening 134 and the image disc 104 is as small as practical. This positioning of the light opening 134 relative to the disc 104 ensures that the light exiting the opening 134 comes into direct contact with the indication 122 disposed on the image disc 104. By placing the shield 132 as close as practical to disc 104, "glowing" or diffusing light from the shield 132 is prevented. Such close placement also prevents stray light from illuminating the indication 122. Additionally, the non-reflective coating on the image surface of the image disc 104 prevents the image disc 104 from reflecting and thereby interfering with light waves from the light source 103 or the light sheet 136.

Figure 13:
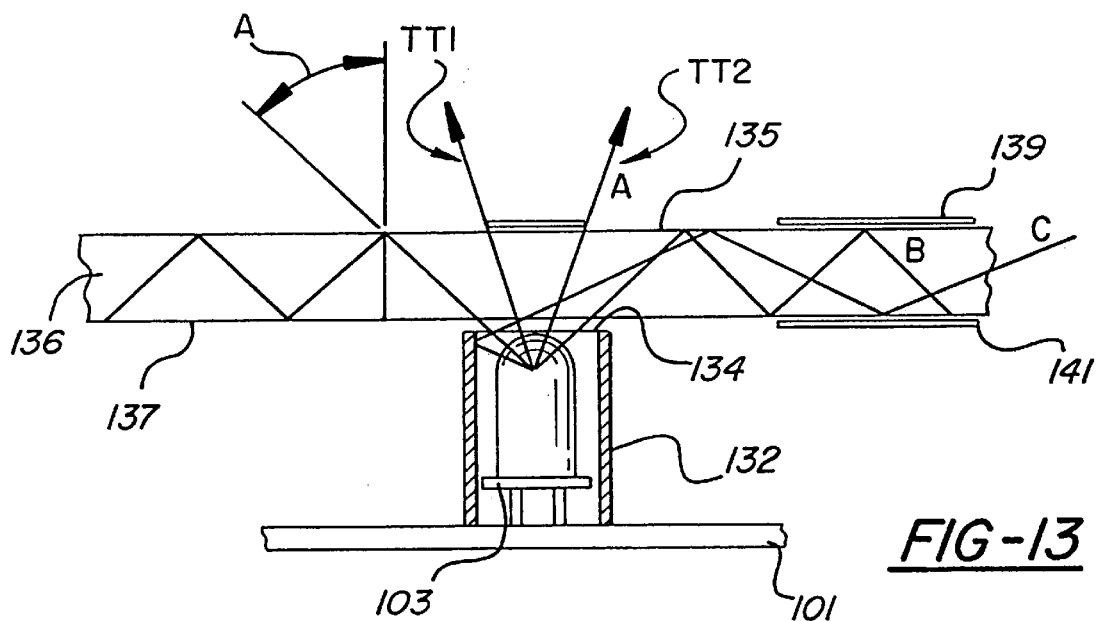
FIG. 13 is a cross-sectional view of the second alternative embodiment illustrating the light characteristics of the light sheet, the light source and the light shield.

Referring to FIG. 13, light sheet 136 is shown positioned just above the light opening 134 of the light shield 132. The light sheet 136 includes an upper surface 135 and a lower surface 137. The light sheet 136 is constructed from a material capable of transmitting light between its outer upper and lower surfaces 135, 137, respectively. For example, light sheet 136 may be constructed from conventional optical materials including, but not limited to glass, polycarbinate or acrylic. The light emitted by light source 103 may be cast at many different angles and travel different paths through the light sheet 136. For example, the light cast by light source 103 may follow the angles and paths designated by light rays B or C in FIG. 13. Any light which strikes the upper surface 135 at an angle less than the critical angle (depicted by Angle A) will pass through the upper surface 135 and exit the light sheet 136 as represented by rays TT1 and TT2. Any light ray which strikes the upper surface 135 at an angle greater than or equal to Angle A will be reflected by the upper surface 135 back toward the lower surface 137. In other words, the light rays will be internally reflected within the sheet 136 as depicted by light rays B and C. In the present invention, the critical angle, A, is calculated by the following formula:

$$I_c = \text{arc sine } N'/N$$

where: $I_c$=critical angle
N'=index of refraction of surrounding media (usually air)
N=index of refraction of light sheet (glass 1.5, acrylic 1.45, air 1.0)

For example, in an air environment the critical angle is 41.8% for a light sheet made from glass and 43.6% for a light sheet made from an acrylic material.

With continued reference to FIG. 13, light from a second light source (not shown) is transmitted within the light sheet 136 such that the light is internally reflected within the light sheet 136. Typically, the light from light source 103 is of one color, such as red and the light from the second light source used to illuminate the light sheet 136 is of another color, such as white. Other graphic images 139 may be displayed on the light sheet upper surface 135 and may be located near the image formed by the indications 122. The graphic images 139 may use a third color, such as green. Light from the second light source strikes a diffusive surface or extractor pass 141 and causes a portion of the diffused light having an angle less than the critical angle, A, to exit through the graphic image 139. If light rays B and C are not contained by light shield 132, then rays B and C will cause the graphic image 139 to change color to a greenish-red color when the light source 103 is lit. To prevent this from occurring, light shield 132 may be designed to have a light opening 134 which directs the light cast by the light source 103 to strike the light sheet upper surface 135 at an angle less than angle A so that light rays from the light source 103 are not internally reflected within the light sheet 136. In other words, the light shield 132 absorbs or traps and thereby prevents those light rays cast by the light source 103 which may interfere with or mix with the light source of the surrounding graphic images 139. That is, the only light that exits the light shield 132 is the light passing through the light opening 134.

Referring again to FIGS. 9–10, the image display apparatus 100 further includes an attachment hub 138 secured to the drive shaft 121 for mounting the image disc 104 thereto. The attachment hub 138 includes an axially extending drive shaft engaging portion 140 and a generally radially extending image disc engaging flange portion 142. The drive shaft engaging portion 140 has a non-circular cross section corresponding to the non-circular cross section of aperture 124 in the image disc 104 for cooperable engagement of the image disc 104 on the axially extending drive shaft engaging portion 140. The axially extending drive shaft engaging portion 140 further includes one or more notches 144 for receiving the tabs 126 of the image disc 104 in a locking, snap-fit arrangement upon assembly of the image disc 104 onto the hub 138.

Figure 14:
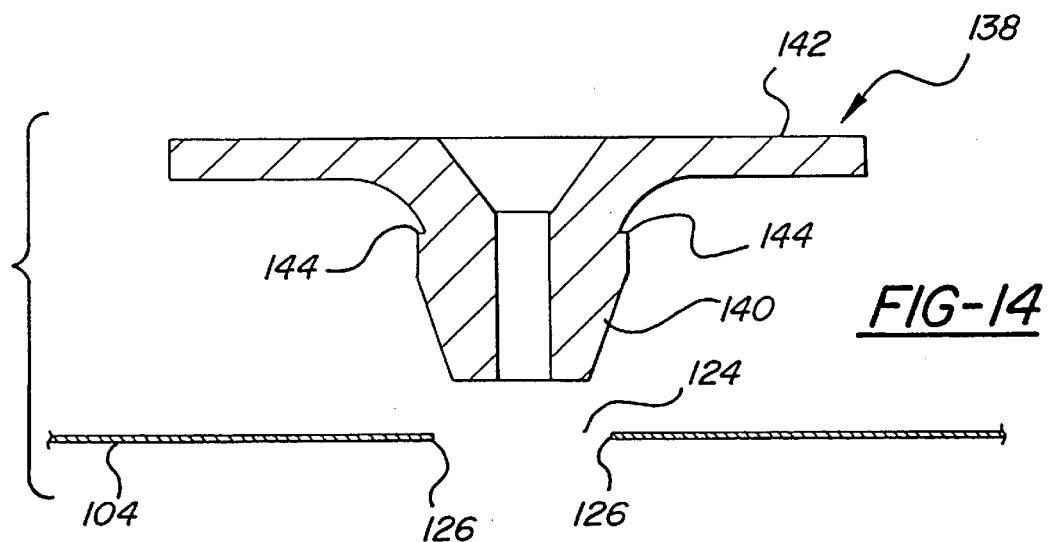
FIG. 14 is a cross-sectional view of the hub and image disc of the second alternative embodiment of the present invention showing the hub and disc disengaged.

FIG. 14 depicts the hub 138 and notch 144 of the axially extending drive shaft engaging portion 140 prior to snap-fit engagement with the tab 126 of the image disc 104.

Figure 15:
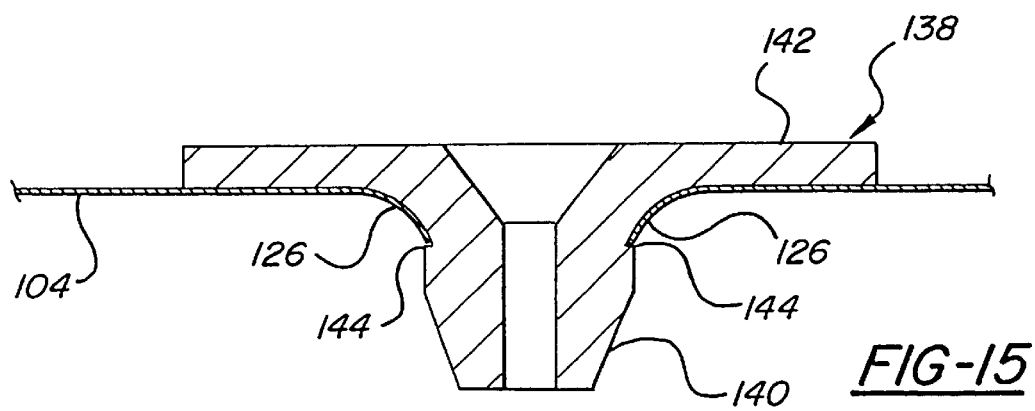
FIG. 15 is a cross-sectional view of the hub and image disc of the second alternative embodiment of the present invention showing the snap fit urged engagement of the hub and image disc.

FIG. 15 depicts the hub 138 and notch 144 of the axially extending drive shaft engaging portion 140 in snap-fit engagement with the tabs 126 of the image disc 104. As seen in FIGS. 14 and 15, the tabs 126 are bent back into spring tension as the image disc 104 is slipped onto the axially extending drive shaft engaging portion 140 via the aperture 124 of the image disc 104. Thus, the tabs 126 exert a spring force on the drive shaft engaging portion 140 and cause the disc 104 to lie flat against the flange portion 142 of the hub 138. In this manner, the image disc 104 is secured to the hub 138 in a flush manner. The tabs 126 of the image disc 104 and the notches 144 of the hub 138 act as a locking mechanism to lock or fixedly mount the image disc 104 to the flange portion 142 of the hub 138 so that the image disc 104 rotates with the hub 138 as the drive shaft 121 rotates.

One skilled in the art will recognize that the device embodiments disclosed above may be used with or without optical elements to form virtual image displays and so called Head-Up-Displays The preferred actuator design has an input impedance of approximately 20 ohms. This equates to a peak current of 250 ma at +5 VDC. Input power pulses should be from 200 ms to 500 ms in duration. LED Lamp 3 requires typically 20 ma to 70 ma to provide the required intensities. The air core gage gauge generally uses 220 ohms per coil.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. An image display apparatus characterized by:
   a substrate wherein said substrate acts as a base having an integrated circuit and electrical connections;
   a driver mounted on said substrate and electrically connected to said integrated circuit, said driver including a controllable rotatably positionable drive providing a plurality of drive rotational positions in response to electrical signal inputs;
   a generally planar image disc having at least one radially disposed indication on a generally planar portion thereof; said image disc being driven by said drive for rotational movement thereby; and
   a directional light source electrically connected to said integrated circuit for illuminating said indication upon juxtaposition with said light source via rotational positioning of said image disc and illumination of said light source, said directional light source including an illuminator and a light absorbing shield including a light opening, said light shield being connected to said substrate about said light source, said light opening being positioned and sized relative to said light source and said image disc providing illumination of said indication, containment of light not directed through said light opening and control of the angle of light emitted from said opening.

2. An image display apparatus as in claim 1 characterized in that:
   said illuminator is a light emitting diode.

3. An image display apparatus as in claim 2 characterized by:
   a light sheet extending in spaced relationship relative to said image disc for viewing said indication through said light sheet.

4. An image display apparatus as in claim 3 characterized in that:
   said light opening is positioned and sized to direct light from said light emitting diode to strike said light sheet at an angle generally of less than 45 degrees to allow said light to pass through said sheet without being reflected within said sheet.

5. An image display apparatus as in claim 3 characterized in that:
   said image disc includes a non-reflective coating on its surface facing said light sheet.

6. An image display apparatus as in claim 1 characterized in that said driver includes a drive shaft extending therefrom and said image disc is mountable about said drive shaft.

7. An image display apparatus as in claim 6 wherein said driver is characterized by:
   an air core gauge having at least two coils electrically connected to said substrate and having inputs of plus, minus, and no voltage; said gauge also having a magnet mounted on said drive shaft whereby eight rotational positions of said shaft are provided in response to said coil inputs.

8. An image display apparatus as in claim 6 characterized by:
   an attachment hub on said drive shaft for mounting said image disc thereto.

9. An image display apparatus as in claim 8 wherein said hub is characterized by:
   an axially extending drive shaft engaging portion and a generally radially extending image disc engaging flange portion;
   said disc being fixedly mountable on said image disc engaging flange portion.

10. An image display apparatus as in claim 9 characterized in that:
    said disc has a centrally located aperture having a non-circular cross section;
    said drive shaft engaging portion has a corresponding shape as said non-circular cross section for cooperable engagement of said image disc on said axially extending drive shaft engaging portion.

11. An image display apparatus as in claim 10 characterized in that:
    said image disc includes a tab adjoining said centrally located aperture; and
    said hub axially extending drive shaft engaging portion includes a notch for receiving said tab in a locking, snap-fit arrangement upon assembly of said image disc onto said hub wherein said tab exerts a spring force on said drive shaft engaging portion so as to cause said disc to lie flat on said disc engaging flange portion.

12. An image display apparatus as in claim 1 characterized in that:

said disc is made of metal material.

13. An image display apparatus as in claim 12 characterized in that:

said indication is chemically etched in said image disc.

14. An image display apparatus as in claim 1 characterized in that:

said image disc is made of a transparent material so as to allow light to pass therethrough.

15. An image display apparatus as in claim 14 characterized in that:

said image disc includes an opaque coating disposed thereon to thereby form said indication by preventing light to pass through said image disc in selected areas.

16. An image display apparatus as in claim 1 characterized in that said light source is a diffusing light source.

17. An image display apparatus as in claim 16 characterized in that:

said diffusing light source includes an illuminator; and a light box positioned about said illuminator.

18. An image display apparatus as in claim 17 characterized in that:

said illuminator is an incandescent lamp.

19. An image display apparatus characterized by:

a substrate wherein said substrate acts as a base having an integrated circuit and electrical connections;

a driver mounted on said substrate and electrically connected to said integrated circuit, said driver including a controllable rotatably positionable drive providing a plurality of drive rotational positions in response to electrical signal inputs;

generally planar image disc having at least one radially disposed indication on a generally planar portion thereof; said image disc being a driven by said drive for rotational movement thereby;

a light emitting diode electrically connected to said integrated circuit for illuminating said indication upon juxtaposition with said light emitting diode via rotational positioning of said image disc and illumination of said light emitting diode; and a light absorbing shield including a light opening; said shield being connected to said substrate about said light emitting diode; said light opening being positioned and sized relative to said light emitting diode and said image disc to provide illumination of said indication, containment of light not directed through said light opening, and control of the angle of light emitted from said opening.

* * * * *